Oct. 29, 1935.    F. M. CRAPO    2,019,445
OVERHEAD ELECTRIC TRANSMISSION LINE
Filed Jan. 8, 1934    2 Sheets-Sheet 1
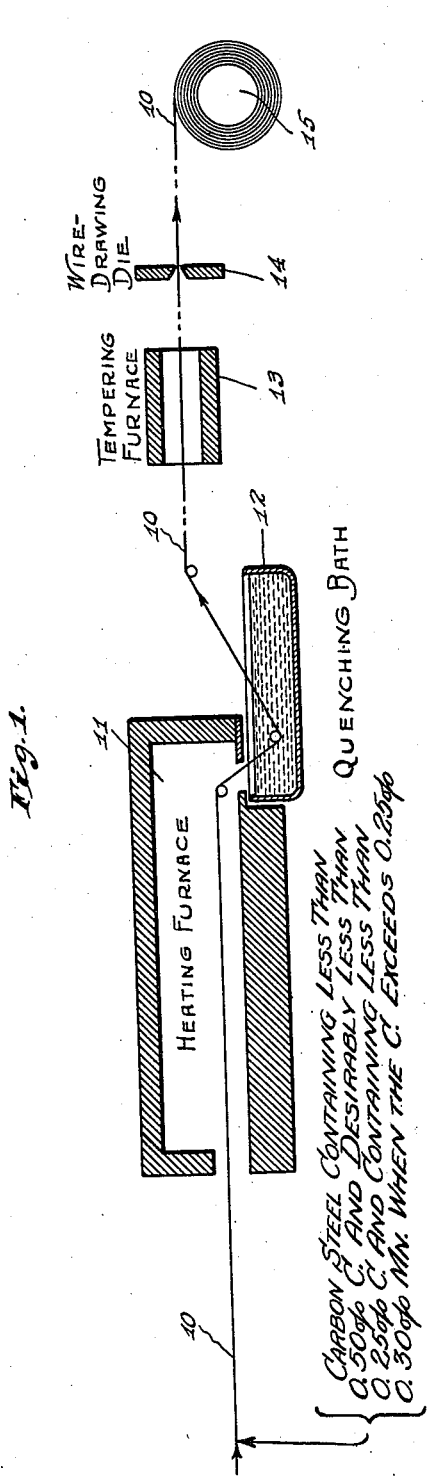
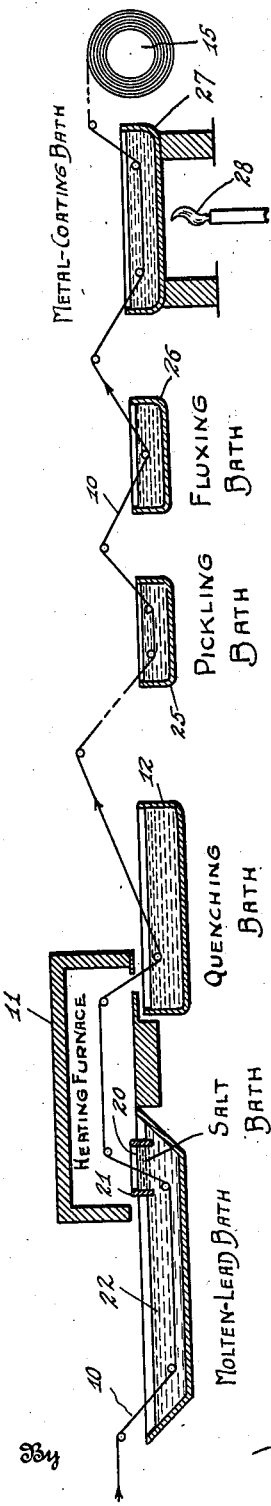
Inventor
FREDERICK M. CRAPO, Oct. 29, 1935.   F. M. CRAPO   2,019,445
OVERHEAD ELECTRIC TRANSMISSION LINE
Filed Jan. 8, 1934   2 Sheets-Sheet 2

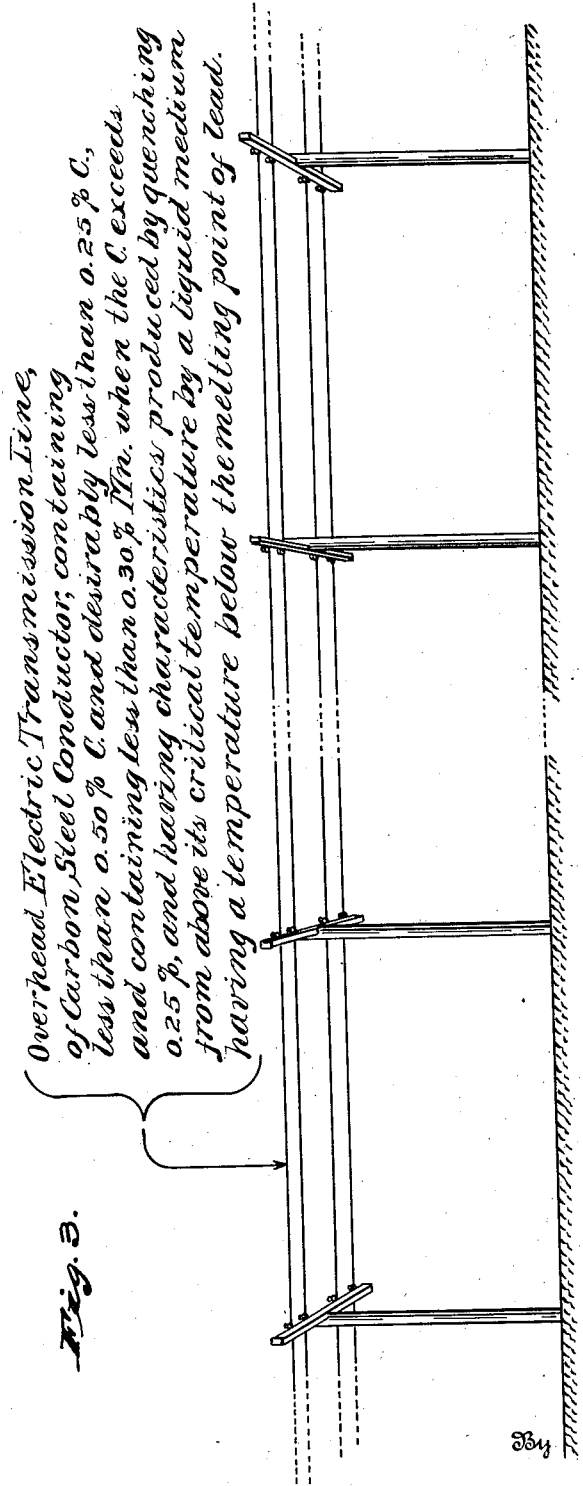

Fig. 3.

Overhead Electric Transmission Line, of Carbon Steel Conductor, containing less than 0.50% C and desirably less than 0.25% C, less than 0.50% C and containing less than 0.30% Mn. when the C exceeds 0.25%, and having characteristics produced by quenching from above its critical temperature by a liquid medium having a temperature below the melting point of lead.

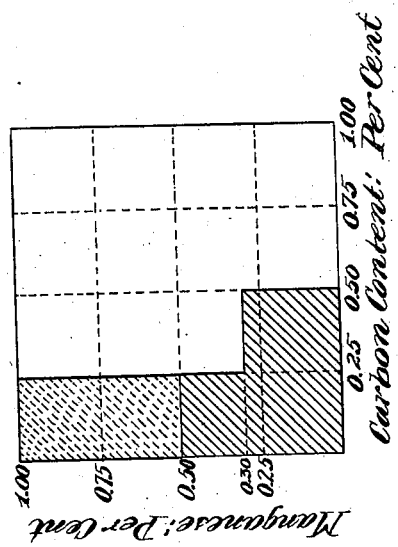

Fig. 4.

Inventor
FREDERICK M. CRAPO,
By
Schley & Trask
Attorneys

Patented Oct. 29, 1935

2,019,445

UNITED STATES PATENT OFFICE 2,019,445

OVERHEAD ELECTRIC TRANSMISSION LINE

Frederick M. Crapo, Muncie, Ind., assignor to Indiana Steel & Wire Company, Muncie, Ind., a corporation of Indiana Application January 8, 1934, Serial No. 705,831

18 Claims. (Cl. 173—13)

My invention relates to overhead electric transmission lines using ferrous conductors. It is applicable, for instance, for power lines, telephone lines, telegraph lines, signal lines, etc.; and the conductors involved may be not only the wires of the transmission circuit proper, but also include various ancillary conductors, such as ground wires, shield wires, messenger cables, catenary supports, etc., which may be primarily for other than conducting purposes and/or may actually serve to conduct current only occasionally. Therefore, by the term "overhead electric transmission line" I mean an overhead line which has a series of wire-spans under tension and which may be required to carry electric current; and by the terms "ferrous conductor" or "carbon-steel conductor" I mean a conductor which may be required to serve as a current carrier for an electric system and of which the cross-section is mainly of ferrous material, specifically carbon steel in my invention, and any coating (as of zinc or copper) is a relatively small part of the cross-section. The term "carbon steel" is used in its accepted sense, (as shown by "The Making, Shaping, and Treating of Steel", by Camp and Francis, published by the Carnegie Steel Company, Fourth Edition, pages 259 and 707, generally accepted as authoritative), as meaning steels in which carbon is the element fundamentally employed to control physical properties; and in which manganese is less in amount than about 1.0%, although in previous hypoeutectoid carbon steels it has usually been greater in amount than the carbon.

It is the object of my invention to produce a transmission line of ferrous conductor (uncoated or coated as with zinc or copper) which has its tensile strength and its electrical conductivity both relatively high. Generally in the prior art an increase in tensile strength in ferrous conductors has been obtained at the cost of decreased electrical conductivity, and an increase in electrical conductivity at the cost of decreased tensile strength; but by my invention I am able to get both relatively high.

Heretofore the ferrous conductors in general use for telephone, telegraph, and signal lines, and in some instances for power lines, have been of three general commercial grades known as "E. B. B." (extra best best), "B. B." (best best), and "steel". Approximate tensile strengths and D. C. resistivities of these grades are as follows:

| Grade | Approximate D. C. resistivity in ohms per mile-pound | Approximate tensile strength in pounds per square inch |
| --- | --- | --- |
| E. B. B. | 4,850 | 45,000 |
| B. B. | 5,800 | 51,000 |
| Steel | 6,750 | 55,000 |

Three other commercial grades of ferrous conductors have also heretofore been used in some instances for power lines; especially for overhead ground wires and/or shield wires, and for long spans such as wide river crossings. These other three grades are commonly known as "Siemens-Martin", "high strength", and "extra-high strength", and are named in the order of increasing tensile strength and D. C. resistivity. Approximate tensile strengths and D. C. resistivities of these three grades are as follows:

| Grade | Approximate D. C. resistivity in ohms per mile-pound | Approximate tensile strength in pounds per square inch |
| --- | --- | --- |
| Siemens-Martin | 7,280 | 90,000 |
| High strength | 8,320 | 140,000 |
| Extra-high strength | 9,360 | 200,000 |

In all the grades known as "Siemens-Martin", "high strength", and "extra-high strength", the advantages of increased tensile strength have been obtained at the sacrifice of electrical conductivity; so that while the tensile strengths of such grades are substantially greater than those of "E. B. B.", "B. B.", or "steel", above mentioned, their electrical conductivities are substantially less. Such increased tensile strength has been obtained fundamentally by increasing the carbon content of the steel used, and/or to some extent and in some cases by so-called "patenting" before drawing the wire to the desired size, and/or by cold-working the material in the process of wire-drawing. The "patenting" referred to involves heating the rod or wire prior to wire-drawing, or at least prior to final wire-drawing, to a temperature above the critical temperature range, and then cooling it through the critical range either in the open air or in molten lead.

According to my present invention, a desired tensile strength is obtained with lower carbon content than in the prior art, and with correspondingly lower resistivity. Thus, to give an example, I can make an overhead transmission line in which the tensile strength is of the order of the Siemens-Martin conductor of the prior art, but in which the carbon content and the D. C. resistivity are materially less than those of such Siemens-Martin conductor.

In other words, for a given tensile strength I can use a decreased carbon content and obtain a decreased resistivity; and for a given carbon content and/or a given resistivity I can obtain an increased tensile strength.

In carrying out my invention I use plain carbon steel in which I keep the carbon content relatively low—in any case below 0.50%, and desirably below 0.25%. I also desirably keep the manganese content relatively low—such as below 0.50%, and preferably below 0.30% as a maximum when the carbon content is above 0.25%. The contents of silicon, phosphorus, and sulphur are also desirably kept low, but may be present in the amounts common in carbon steels. These carbon steels may be copper-bearing steels.

In making the conductor, the carbon steel is quenched from a temperature which is at least higher than the $Ac_1$ or lowermost critical temperature, and desirably higher than the $Ac_3$ or uppermost critical temperature, by immersion in a liquid quenching medium of relatively low temperature. The temperature of the liquid quenching medium is desirably below the boiling point of water, especially for conductors of steels in the lower range of carbon contents, say below 0.25%; and in any case is below the melting point of lead (621° F.), so that the steel will be brought to a cold condition in a state which has relatively high tensile strength in contrast to that produced by "patenting". In general the lower the carbon content the lower should be the temperature of the liquid quenching medium. For steels of the lower carbon contents especially, the liquid quenching medium is desirably water, oil, or some suitable aqueous solution; while for steels of the higher carbon contents it may be a low-melting salt or mixture of salts, melting in any case below the melting point of lead.

The quenching in accordance with my invention may be either after the final wire-drawing in making the conductor, or at some earlier stage followed by one or more subsequent drafts. In many instances it is desirable to make one or more drafts after the quenching, as thereby the increased tensile strength produced by the quenching is augmented by that produced by the cold-working incident to wire-drawing.

The quenching may be the final and/or the only heat treatment of the conductor; but it is not necessarily either. For instance, there may be a previous heat treatment, as by the "patenting" already referred to; and there may be subsequent heat treatments, either expressly for heat-treating purposes, as by partially "drawing the temper" to reduce the hardening produced by the quenching, or primarily for some other purpose with only an incidental heat-treating effect, as in hot-galvanizing by passing the conductor through a bath of molten zinc.

If the conductor is to be subsequently coated with a coating metal, such as zinc, as for instance by hot-galvanizing, and especially if the carbon content of the steel is low, it is desirable for promoting adhesion of the zinc that the conductor be given a treatment to produce by chemical change a permeative addition on the surface thereof; as for example of carbon and/or nitrogen and/or phosphorus. This may be done by passing the conductor through a suitable salt bath, such as one containing cyanide or cyanamid, or through a suitable gas, such as ammonia or phosphine; in the manner set forth in my Patents Nos. 1,501,887 and 1,552,041, granted July 15, 1924, and September 1, 1925, respectively, and in the Crapo and Baylis Patent No. 1,545,305, granted July 7, 1925. This treatment to produce by chemical change such a permeative addition on the surface of the conductor is desirably before the quenching operation; and may constitute either part or the whole of the heating process by which the conductor is heated above the critical temperature prior to quenching.

I have found that not only is the tensile strength raised when a conductor has been quenched as above described, but that the electrical resistivity of such conductor, both A. C. and D. C., is not raised in corresponding proportion, and that the A. C. resistance for currents of telephonic character, exemplified by currents of 1000 cycles per second and 5 milliamperes, may even be lowered.

In the following table, which is merely illustrative and not exhaustive, are shown certain approximate comparative values of tensile strength, D. C. resistivity, and A. C. resistance for two conductors, of respectively high and low carbon contents within the permissible range of my invention, with and without the quenching which my invention contemplates:

*Unquenched vs. quenched*

*No. 12 B. W. G. galvanized wire*

| Sample | Carbon | Manganese | D. C. resistivity in ohms per mile-pound | | | A. C. resistance in ohms per 1,000 feet to currents of 1,000 cycles per second and 5 milliamperes | | | Tensile strength in pounds per square inch | | |
|---|---|---|---|---|---|---|---|---|---|---|---|
| | | | Unquenched | Quenched | Increase | Unquenched | Quenched | Decrease | Unquenched | Quenched | Increase |
| | | | | | Pct. | | | Pct. | | | Pct. |
| A | 0.15 | 0.39 | 5530 | 5760 | 4.2 | 10.30 | 8.60 | 17 | 58,000 | 105,000 | 81 |
| B | 0.41 | 0.21 | 5360 | 5610 | 4.7 | 9.26 | 8.83 | 5 | 74,000 | 125,000 | 69 |

I may use various types of apparatus for carrying out my invention. In the accompanying drawings I show diagrammatically two forms of such apparatus; and also show diagrammatically a transmission line embodying my invention, and the carbon and manganese contents in the carbon steel of the conductor used in such transmission line. In those drawings, Fig. 1 is a diagrammatic view of a simple heating and quenching apparatus, with a subsequent tempering apparatus and a subsequent wire-drawing apparatus either or both of which may be used if desired; Fig. 2 is a diagrammatic view of a slightly more elaborate apparatus, in which in addition to the heating and quenching apparatus there are also shown diagrammatically apparatus for a preliminary salt treatment and apparatus for a subsequent metal-coating treatment; Fig. 3 is a diagrammatic view of an overhead electric transmission line, of ferrous conductor, in accordance with my invention, the particular character of ferrous conductor being indicated by a legend on the drawings; and Fig. 4 is a diagram showing the contents of carbon and manganese in such ferrous conductor, the area in solid-line cross-hatching indicating the preferred area, and the area in broken-line cross-hatching indicating a permissive area.

In the simple apparatus shown diagrammatically in Fig. 1, the ferrous wire or conductor 10, which may already have been subjected to some or all of any desired wire-drawing, is passed through a heating apparatus 11, of any suitable type, in which the temperature of the conductor is raised at least above the $Ac_1$ or lowermost critical temperature and desirably above the $Ac_3$ or uppermost critical temperature. As is well-known, these critical temperatures vary with the composition of the steel. The heating apparatus 11 is conveniently but not necessarily a furnace of the muffle type; and the atmosphere within it may be of any desired character, even one which tends to produce by chemical change a permeative addition in the surface of the conductor, such as the ammonia gas of the Crapo Patent No. 1,552,041 already referred to.

From the heating apparatus 11 the wire or conductor 10 passes immediately to the quenching bath 12, in which while still above the critical temperature it is immediately immersed in a quenching medium of the character already described—one which in any case has a temperature below the melting point of lead, and in many instances a temperature below the boiling point of water. This quenching from above the critical temperature to this low temperature carries the steel very rapidly downward through the critical range, so that when the steel becomes cold it has a high tensile strength—materially higher than that produced by cooling in a bath of molten lead such as occurs in some types of "patenting".

The treatment in the heating apparatus 11 and the quenching bath 12 are all that are fundamentally necessary according to my invention. The conductor 10 may be used in the state in which it comes from the quenching bath 12. On the other hand, it may have other treatments.

Thus after the conductor leaves the quenching bath 12, its temper may be partially drawn; as by passing the conductor through a suitable tempering furnace 13. When such a tempering furnace is employed, it raises the temperature of the conductor to the temperature necessary for drawing the temper to the desired extent. The tempering step, as by the tempering furnace 13, is not essential, but it is often desirable, especially in conductors of the higher carbon contents (within the range of my invention), and especially when the quenching has been in a quenching medium of the water type.

The temperature of the tempering furnace varies with the composition of the wire, usually being greater as the carbon content is raised; with the suddenness and extent of the chilling produced by the quenching, usually being greater as such chilling has been more drastic; with the character of subsequent treatments, if any; and with the tensile strength and other characteristics desired in the final conductor.

In addition, and whether or not the conductor is tempered after it leaves the quenching bath 12, it may if desired be passed through one or more wire-drawing dies 14—of which for simplicity only one is shown. In passing through the die or dies 14, the conductor is subjected to the cold working incidental to reducing its diameter; and this cold working serves to increase the tensile strength still further, beyond that produced by the quenching. Before the wire or conductor 10 is passed through the wire-drawing die or dies 14, of course, it is given any necessary preparatory treatments for drawing.

In Fig. 1, the tempering furnace 13 and wire-drawing die 14 are shown as acting on the wire or conductor 10 in continuous operation with the heating furnace 11 and quenching bath 12, and as being drawn through them in series by a take-up block or reel 15. This continuity of operation, however, is not essential; for if either or both of the tempering furnace and the wire-drawing die are used, any desired time may intervene between their operations on the conductor and the operations which Fig. 1 shows as preceding them in the continuous operation.

In the apparatus shown diagrammatically in Fig. 2, there is a heating furnace 11, a quenching bath 12, and a take-up block or reel 15, as in Fig. 1. In addition, the wire or conductor 10 is passed through another heating device before it reaches the heating furnace 11. This other heating device may take the form of a molten-salt bath 20, from which the wire passes directly into the heating furnace 11; with the salt of such character, as by containing cyanide or cyanamid, that it produces by chemical change such a permeative addition on the surface of the wire or conductor that adhesion of a subsequently applied zinc coating is improved, as set forth in my prior Patent No. 1,501,887 already referred to. The molten salt of the bath 20 may be contained within a band or rim 21, and may float on a bath of molten lead 22 through which the wire or conductor 10 passes on its way to the salt bath 20 and from which the conductor passes upward directly into and through the molten salts within the band or rim 21, as shown in the Crapo and Baylis Patent No. 1,545,305 already referred to. As the wire 10 passes through the molten material of the lead bath 22, and/or of the salt bath 20, it is heated toward or to the desired temperature above the critical range; so that less heating or no heating is required within the heating furnace 11 to reach that temperature. If desired, the heating within the molten liquid of the baths 22 and/or 20 may be sufficient to raise the temperature of the wire or conductor to the desired value; in which case the heating furnace 11 may be omitted, and the conductor passed immediately from the molten material to the quenching bath 12.

In the apparatus shown in Fig. 2, the wire or conductor 10, after it has left the quenching bath 12, is shown as passing through certain preliminary treating devices, such as a pickling bath 25 and a fluxing bath 26, to a metal-coating bath 27, and thence to the take-up block or reel 15. But it is not necessary that this entire operation be continuous; for any desired time, permitting certain aging effects to be obtained, may be allowed to intervene between the quenching and the metal-coating.

The coating bath 27 may be for applying a coating of any desired or suitable metal, in any desired manner, as by electro-deposition or by hot-dipping. Often it is a hot-galvanizing tank, in which zinc is maintained molten by suitable heating means 28 shown diagrammatically below the metal-coating bath 27. When the metal-coating bath 27 is a hot-galvanizing bath, in which the wire or conductor 10 is coated with zinc, it is of especial advantage to use the bath of molten salts 20, to promote adhesion of the zinc to the conductor.

When the coating bath 27 is a hot-galvanizing bath, it inherently involves a heat treatment of the wire or conductor 10 passing through it; and that heat treatment partially draws the temper of the conductor from the maximum hardness produced in the quenching bath 12. Thus when the coating bath 27 is a hot-galvanizing bath, it is commonly not necessary or desirable to use a tempering furnace 13 in addition; but my invention does not preclude the use of both on the same conductor, for the tempering and the extent of the tempering are secondary matters in my invention.

The conductor thus produced is used in an overhead electric transmission line, as is illustrated in Fig. 3.

The apparatus shown in the drawings is merely illustrative, and may be varied in many respects. My invention does not depend on any particular apparatus. Instead, it is directed to an overhead electric transmission line including a conductor of the type described either as a single wire or in a stranded cable.

I claim as my invention:—

1. An overhead electric transmission line, comprising a conductor of carbon steel which contains less than 0.50% carbon, which contains less than 0.30% manganese when the carbon exceeds 0.25%, and which has been quenched from above its $Ac_1$ critical temperature by a liquid medium having a temperature below the melting point of lead.

2. An overhead electric transmission line, comprising a conductor of carbon steel which contains less than 0.50% carbon, which contains less than 0.30% manganese when the carbon exceeds 0.25%, and which has been quenched from above its $Ac_3$ critical temperature by a liquid medium having a temperature below the melting point of lead.

3. An overhead electric transmission line, comprising a conductor of carbon steel which contains less than 0.50% carbon, and which has been quenched from above its $Ac_1$ critical temperature by a liquid medium having a temperature below the melting point of lead.

4. An overhead electric transmission line, comprising a conductor of carbon steel which contains less than 0.50% carbon, and which has been quenched from above its $Ac_3$ critical temperature by a liquid medium having a temperature below the melting point of lead.

5. An overhead electric transmission line, comprising a conductor of carbon steel which contains less than 0.25% carbon, and which has been quenched from above its $Ac_1$ critical temperature by a liquid medium having a temperature below the boiling point of water.

6. An overhead electric transmission line, comprising a conductor of carbon steel which contains less than 0.25% carbon, and which has been quenched from above its $Ac_3$ critical temperature by a liquid medium having a temperature below the boiling point of water.

7. An overhead electric transmission line, comprising a conductor of carbon steel which contains between 0.25% and 0.50% of carbon and not in excess of 0.30% of manganese, and which has been quenched from above its $Ac_1$ critical temperature by a liquid medium having a temperature below the melting point of lead.

8. An overhead electric transmission line, comprising a conductor of carbon steel which contains between 0.25% and 0.50% of carbon and not in excess of 0.30% of manganese, and which has been quenched from above its $Ac_3$ critical temperature by a liquid medium having a temperature below the melting point of lead.

9. An overhead electric transmission line, comprising a conductor of carbon steel which contains less than 0.50% carbon, which contains less than 0.30% manganese when the carbon exceeds 0.25%, and which has been quenched from above its $Ac_1$ critical temperature by a liquid medium having a temperature below the melting point of lead and then had its temper partially drawn by subsequent heat treatment.

10. An overhead electric transmission line, comprising a conductor of carbon steel which contains less than 0.50% carbon, which contains less than 0.30% manganese when the carbon exceeds 0.25%, and which has been quenched from above its $Ac_3$ critical temperature by a liquid medium having a temperature below the melting point of lead and then had its temper partially drawn by subsequent heat treatment.

11. An overhead electric transmission line, comprising a conductor of carbon steel which contains between 0.25% and 0.50% of carbon and not in excess of 0.30% of manganese, and which has been quenched from above its $Ac_1$ critical temperature by a liquid medium having a temperature below the melting point of lead and then had its temper partially drawn by subsequent heat treatment.

12. An overhead electric transmission line, comprising a conductor of carbon steel which contains between 0.25% and 0.50% of carbon and not in excess of 0.30% of manganese, and which has been quenched from above its $Ac_3$ critical temperature by a liquid medium having a temperature below the melting point of lead and then had its temper partially drawn by subsequent heat treatment.

13. An overhead electric transmission line, comprising a conductor of carbon steel which contains less than 0.50% carbon, which contains less than 0.30% manganese when the carbon exceeds 0.25%, and which has been quenched from above its $Ac_1$ critical temperature by a liquid medium having a temperature below the melting point of lead and then hot-galvanized.

14. An overhead electric transmission line, comprising a conductor of carbon steel which contains less than 0.50% carbon, which contains less than 0.30% manganese when the carbon exceeds 0.25%, and which has been quenched from above its $Ac_3$ critical temperature by a liquid medium having a temperature below the melting point of lead and then hot-galvanized.

15. An overhead electric transmission line, comprising a conductor of carbon steel which contains less than 0.50% carbon, which contains less than 0.30% manganese when the carbon exceeds 0.25%, and which has been quenched from above its $Ac_1$ critical temperature by a liquid medium having a temperature below the melting point of lead and subsequently cold-drawn to form the conductor.

16. An overhead electric transmission line, comprising a conductor of carbon steel which contains less than 0.50% carbon, which contains less than 0.30% manganese when the carbon exceeds 0.25%, and which has been quenched from above its $Ac_3$ critical temperature by a liquid medium having a temperature below the melting point of lead and subsequently cold-drawn to form the conductor.

17. An overhead electric transmission line, comprising a conductor of carbon steel which contains less than 0.50% carbon, which contains less than 0.30% manganese when the carbon exceeds 0.25%, and which has been quenched from above its $Ac_1$ critical temperature by a liquid medium having a temperature below the melting point of lead and then had its temper partially drawn by subsequent heat treatment and subsequently cold-drawn to form the conductor.

18. An overhead electric transmission line, comprising a conductor of carbon steel which contains less than 0.50% carbon, which contains less than 0.30% manganese when the carbon exceeds 0.25%, and which has been quenched from above its $Ac_3$ critical temperature by a liquid medium having a temperature below the melting point of lead and then had its temper partially drawn by subsequent heat treatment and subsequently cold-drawn to form the conductor.

FREDERICK M. CRAPO.